(12) United States Patent
Williams et al.

(10) Patent No.: US 6,365,268 B1
(45) Date of Patent: Apr. 2, 2002

(54) DEEP SEA INSULATION MATERIAL

(75) Inventors: Michael R. Williams, Houston; Christopher E. Cunningham, Spring, both of TX (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/587,705

(22) Filed: Jun. 5, 2000

(51) Int. Cl.$^7$ ................................ B32B 5/16
(52) U.S. Cl. .................. 428/327; 428/323; 428/325; 428/332; 428/402.21; 428/402.24; 428/423.1
(58) Field of Search ................ 428/323, 325, 428/327, 332, 377, 402, 402.21, 402.24, 423.1, 446

(56) References Cited

U.S. PATENT DOCUMENTS

| | | | |
|---|---|---|---|
| 3,669,912 A | | 6/1972 | Hinton |
| 4,111,713 A | * | 9/1978 | Beck ........................ 106/288 B |
| 4,992,497 A | * | 2/1991 | Wright ........................ 524/147 |
| 5,476,343 A | | 12/1995 | Sumner ........................ 405/157 |
| 5,871,034 A | * | 2/1999 | Sumner ........................ 138/149 |
| 6,090,879 A | * | 7/2000 | Takuman et al. ............ 524/437 |

FOREIGN PATENT DOCUMENTS

| | | |
|---|---|---|
| EP | 473 215 | 3/1992 |
| GB | 1 246 582 | 9/1971 |
| GB | 2 009 181 | 6/1979 |
| GB | 1 552 204 | 9/1979 |
| WO | 99/05447 | 2/1999 |

* cited by examiner

*Primary Examiner*—Blaine Copenheaver
*Assistant Examiner*—Christopher Paulraj
(74) *Attorney, Agent, or Firm*—Pauley Petersen Kinne & Erickson

(57) ABSTRACT

An insulation material useful in deep water well drilling applications includes an elastic polymer matrix, a plurality of rigid macro-beads within the elastic polymer matrix, an inelastic polymer matrix within the macro-beads, and a plurality of hollow, insulative micro-beads within the inelastic polymer matrix. The insulation material has adequate flexibility and elasticity to withstand thermal expansion and contraction, adequate compressive strength to withstand high water pressures, and good insulative properties at cold temperatures near the freezing point of water.

29 Claims, 1 Drawing Sheet

DEEP SEA INSULATION MATERIAL

FIELD OF THE INVENTION

This invention relates to an insulation material suitable for use on subsea equipment in deep water applications.

BACKGROUND OF THE INVENTION

Offshore oil and gas wells are being developed in deeper waters where ambient seawater temperatures near the seabed are quite cold, typically only a few degrees above the freezing point of water. These very cold conditions can lead to plugging of the subsea wells and connected flowlines if the petroleum products produced from the wells are allowed to cool down to ambient temperature. In most cases, the temperature of the oil and/or gas produced from these wells is relatively hot (150° F. to 250° F. or more) within the reservoir. The fluids lose heat as they flow through the subsea equipment and pipelines which bring the fluids to a surface based processing facility. If the fluids fall below certain limits (typically in the range of 50° F. to 70° F.) deposition of paraffin wax and/or formation of methane hydrates can lead to flow restrictions and/or blockage of the subsea production system. Thus, particularly for deep water systems, it is desirable to provide effective thermal insulation on the subsea equipment to prevent excessive cooling of the produced fluids before they reach the processing facility.

Known insulation materials include polymer foams, nearly incompressible polymers, and nearly incompressible polymers filled with very small (e.g., microscopic) solid ceramic beads or hollow plastic or glass beads. Polymer foams provide good insulation in low pressure applications, but collapse under high pressure in deep water. Nearly incompressible polymers maintain their integrity, but are not good insulators.

Nearly incompressible polymers filled with very small (e.g., microscopic) hollow ceramic or hollow glass beads provide good insulation. Unfortunately, these materials are quite hard and brittle, are difficult to install, and are prone to cracking. Cracking occurs when the insulation material and underlying steel equipment are heated and cooled. During heating, the inner surface of the insulation material (adjacent the hot steel equipment) expands more than the outer surface of the insulation material (adjacent the cold sea water). This differential expansion causes cracking. During cooling, the insulation material shrinks more and faster than the steel equipment, causing more cracking.

There is a need or desire for an insulation material which does not collapse under pressure, does not crack, is easy to install, and provides effective insulation at low temperatures.

SUMMARY OF THE INVENTION

The present invention is an insulation material suitable for use in deep sea applications, which alleviates the problems of collapsing, cracking, and insufficient performance associated with prior art materials. The insulation material of the invention includes a first ("global") polymer matrix made from a flexible elastomeric thermoset or thermoplastic polymer material. Contained within the first polymer matrix are a plurality of macro-beads having mean diameters of about 0.05 to about 1.0 inch. Each of the macro-beads is formed with a second polymer matrix that is generally more rigid and less flexible than the first polymer matrix, and is made from a relatively inelastic thermoset or thermoplastic polymer material. Contained within the second polymer matrix are a plurality of insulative micro-beads having mean diameters of about 0.0003 to about 0.125 inch, and having an interior which may be partially hollow and gas filled, or may be solid.

During use, the more rigid macro-beads provide insulative properties similar to the best prior art deep sea insulative materials, made of the brittle composite described above. The elastic polymer matrix containing the macro-beads provides flexibility to the insulative material by permitting thermal expansion and contraction of the macro-beads, and of the deep sea equipment being insulated. The elastic polymer matrix surrounding the macro-beads simply stretches and retracts in response to the thermal expansion and contraction of the macro-beads and/or the insulated equipment, thus avoiding the cracking associated with the most effective prior art insulative materials.

With the foregoing in mind, it is a feature and advantage of the invention to provide an improved insulative material which protects equipment and pipelines from cold sea water temperatures, and withstands high external pressure, deflection-induced stresses and thermally-induced dimensional stresses.

It is also a feature and advantage of the invention to provide a method of applying the improved insulative material to deep sea equipment and/or pipelines.

These and other features and advantages will become further apparent from the following detailed description of the presently preferred embodiments, read with the accompanying drawing.

DETAILED DESCRIPTION OF THE PRESENTLY PREFERRED EMBODIMENTS

Figure 1:
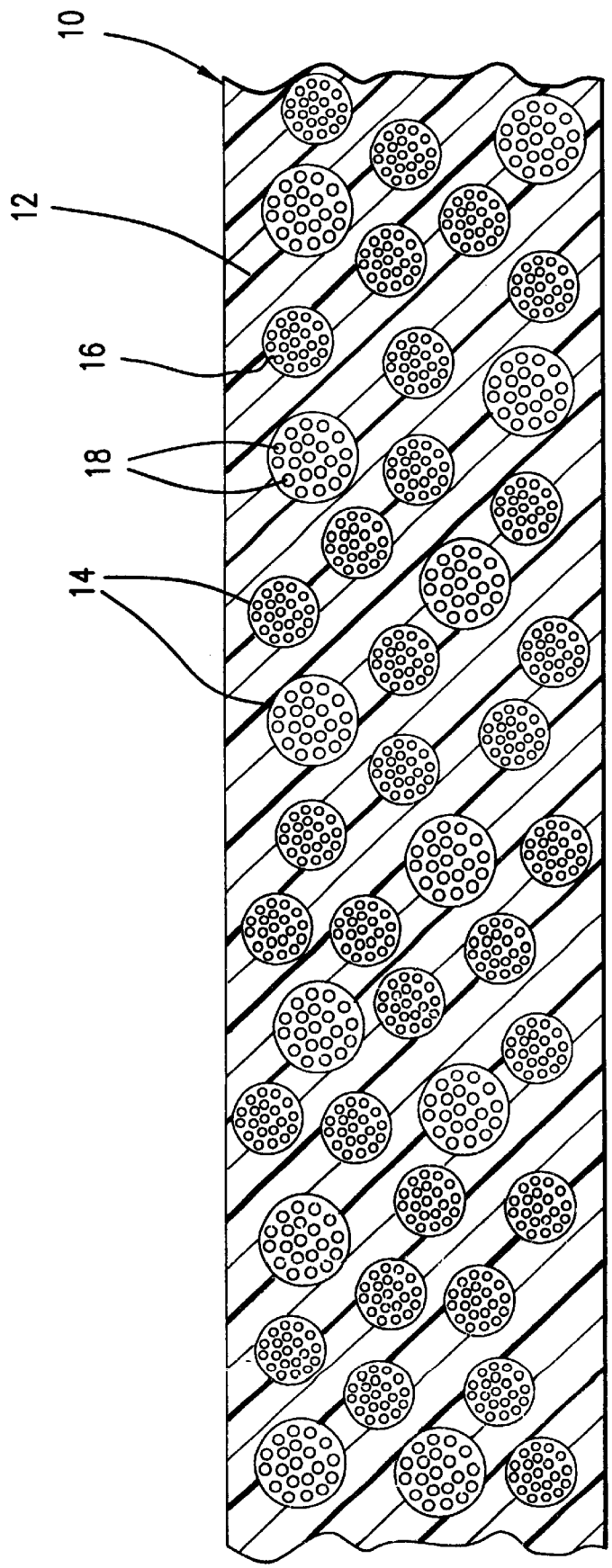
FIG. 1 is a sectional view of an insulative material of the invention.

The present invention is an insulative material suitable for deep sea applications. Referring to FIG. 1, an insulative layer or material 10 includes a first matrix 12 of elastic thermoset or thermoplastic polymer, and a plurality of macro-beads 14 contained within the first ("global") matrix 12. Each macro-bead 14 is formed from a second matrix 16 of relatively inelastic thermoset or thermoplastic polymer, and a plurality of micro-beads 18 contained within the second matrix 16.

As used herein, the term "elastic polymer" refers to a polymer which, when formed into a one-inch thick film or sheet not containing any beads or fillers, can be uniformly stretched in at least one direction by at least 25%, i.e. to at least 125% of its initial unstretched length at 35° F. without breaking or rupturing, preferably to at least 150% of its initial length, more preferably to at least 200% of its initial length, most preferably to at least 300% of its initial length. The term "inelastic polymer" or "relatively inelastic polymer" refers to a polymer which, when formed into a one-inch thick film or sheet, can be uniformly stretched by no more than about 20%, i.e. to no more than about 120% of its initial unstretched length in any direction at 35° F. without breaking, preferably to no more than 110% of its initial length, more preferably to no more than 105% of its initial length. The "stretchability" of a material refers to the longest distance a one-inch thick sample of the pure material can be steadily and uniformly stretched in any direction without breaking, at 35° F.

Suitable elastic polymers for the first matrix 12 include thermosetting and thermoplastic elastic polymers. Thermosetting elastic polymers include, without limitation, aromatic polyurethanes curable with isocyanate cross-linking agents, liquid polysulfides curable with a metal oxide or epoxy curing agent, silicone rubbers curable with a wide variety of peroxide and other known catalysts, and ethylene propylene diene resins curable with peroxides and other catalysts. Preferably, the thermosetting polymers are curable at room temperature. Suitable thermoplastic elastic polymers include, without limitation, thermoplastic polyurethanes, polyether esters, styrene butadiene copolymers, and the like. Blends of these materials are also suitable, so long as the blend is elastic.

The macro-beads 14 should have a mean particle diameter of about 0.05–1.0 inch, preferably about 0.10–0.75 inch, more preferably about 0.15–0.50 inch. The insulative material 10 should include as large a quantity of the macro-beads 14 as possible to facilitate effective thermal insulation. The insulative material 10 should include about 10–70% by weight first polymer matrix 12 and about 30–90% by weight macro-beads 14, preferably about 20–60% by weight first polymer matrix 12 and 40–80% by weight macro-beads 14, more preferably about 30–50% by weight first polymer matrix 12 and about 50–70% by weight macro-beads 14. Macro-beads 14 of two or more different mean diameters may be combined in order to facilitate high macro-bead loading.

The second polymer matrix 16 should be less elastic, and more rigid, than the first polymer matrix 12. A wide variety of relatively inelastic thermoset or thermoplastic polymers can be employed for the second matrix 16. Suitable inelastic thermosetting polymers include, without limitation, rigid epoxy-based resins, rigid (i.e., highly crosslinked) polyurethanes, and the like. Suitable inelastic thermoplastic polymers include, without limitation, polyethylenes, polypropylenes, polycarbonates, polystyrenes, polyvinyl chlorides, and the like.

The solid or hollow micro-beads 18 contained in the second polymer matrix 16 may be constructed from ceramic, glass, plastic, or another material highly resistant to compressive fracture. The term "hollow" means that at least about 10% of the volume occupied by an individual microbead is filled with air or another insulative gas. Preferably, at least about 25% and, more preferably, at least about 50% of the volume occupied by a hollow micro-bead is filled with air or another insulative gas. The term "solid" refers to micro-beads that are not hollow. The micro-beads 18 should have a mean diameter of about 0.0003–0.125 inch, preferably about 0.0005–0.05 inch, more preferably about 0.001–0.01 inch.

The macro-beads 14 should include about 10–70% by weight of the second polymer matrix 16 and about 30–90% by weight of the micro-beads 18. Preferably, the macro-beads 14 include about 20–60% by weight of the second polymer matrix 16 and about 40–80% by weight of the micro-beads 18. More preferably, the macro-beads 14 include about 30–50% by weight of the second polymer matrix 16 and about 50–70% by weight of the micro-beads 18.

The insulation material of the invention can be applied in one or more layers of desired thickness. The thickness of the insulation layer 10 may range from about 0.25–5.0 inches, suitably about 0.5–4.0 inches, desirably about 1.0–3.0 inches. The insulation material may be applied as a tape or other pre-formed layer, or may be formed in situ by constructing a mold around the object to be insulated, and injecting an uncured and/or molten mix of precursor insulation material into the mold. The insulation material may then harden within the mold, via the curing (if thermoset) or cooling from a molten state (if thermoplastic). The insulation material may also be applied as a trowelable paste which hardens after its application.

The insulation material of the invention can also be manufactured using a variety of techniques. Macro-beads 14 can be formed by mixing micro-beads 18 with the second matrix polymer 16, placing the mixture into molds to form the macrobeads 14, and then solidifying the mixture via curing (if polymer 16 is thermosetting) or cooling (if polymer 16 is thermoplastic). Both the macro-beads 14 and micro-beads 18 may be spherical, or may have another suitable shape. Then, macro-beads 14 can be mixed with the first polymer matrix 12, and this mixture can be solidified by curing (if the first matrix polymer 12 is thermosetting) or cooling (if the first matrix polymer is thermoplastic).

In an alternative embodiment, the insulation layer 10 of the invention can be pre-formed, and covered on both sides with an elastomeric jacket. The elastomeric jacket can be formed from the same elastic polymers used in the first matrix 12 or another suitable elastic material. The elastic jacket can have a thickness on both sides of insulation layer 10, of about 0.25–2.0 inch (or about 0.125–1.0 inch per side). The elastic jacket protects the insulation layer 10 from leakage or separation in the event that layer 10 does crack during use. The elastic jacket may be in the form of a sleeve which surrounds insulation layer 10.

The resulting insulation material provides an excellent combination of insulative properties, durability, and flexibility, as required for deep sea applications.

While the embodiments of the invention described herein are presently preferred, various modifications and improvements can be made without departing from the spirit and scope of the invention. The scope of the invention is indicated by the appended claims, and all changes that fall within the meaning and range of equivalents are intended to be embraced therein.

We claim:

1. A combination including an object and a layer of thermal insulation material on the object, the insulation material comprising:
    a thermoplastic elastic first matrix polymer;
    a plurality of macro-beads within the elastic first matrix polymer;
    an inelastic second matrix polymer forming the macro-beads; and
    a plurality of micro-beads within the inelastic second matrix polymer.

2. The insulation material of claim 1, wherein the elastic first matrix polymer is uniformly stretchable to at least 125% of an initial, unstretched length.

3. The insulation material of claim 1, wherein the elastic first matrix polymer is uniformly stretchable to at least 150% of an initial, unstretched length.

4. The insulation material of claim 1, wherein the elastic first matrix polymer is uniformly stretchable to at least 200% of an initial, unstretched length.

5. The insulation material of claim 1, wherein the elastic first matrix polymer is uniformly stretchable to at least 300% of an initial, unstretched length.

6. The insulation material of claim 1, wherein the macro-beads have a mean diameter of about 0.05–1.0 inch.

7. The insulation material of claim 1, wherein the macro-beads have a mean diameter of about 0.10–0.75 inch.

8. The insulation material of claim 1, wherein the macro-beads have a mean diameter of about 0.15–0.50 inch.

9. The insulation material of claim 1, wherein the micro-beads have a mean diameter of about 0.0003–0.125 inch.

10. The insulation material of claim 1, wherein the micro-beads have a mean diameter of about 0.0005–0.05 inch.

11. The insulation material of claim 1, wherein the micro-beads have a mean diameter of about 0.001–0.01 inch.

12. The combination of claim 1 further including an elastic jacket covering the layer.

13. A combination including an object and a layer of thermal insulation material on the object, the insulation material comprising:

an elastic first matrix polymer;

a plurality of macro-beads within the elastic first matrix polymer;

an inelastic second matrix polymer forming the macro-beads; and a plurality of micro-beads within the inelastic second matrix polymer, wherein the elastic first matrix polymer comprises a polyurethane.

14. A combination including an object and a layer of thermal insulation material on the object, the insulation material comprising:

an elastic first matrix polymer;

a plurality of macro-beads within the elastic first matrix polymer;

an inelastic second matrix polymer forming the macro-beads; and a plurality of micro-beads within the inelastic second matrix polymer, wherein the elastic first matrix polymer comprises a polysulfide.

15. A combination including an object and a layer of thermal insulation material on the object, the insulation material comprising:

about 10–70% by weight of a first polymer matrix comprising an elastic polymer;

about 30–90% by weight macro-beads having a mean diameter of 0.05–1.0 inch, within the first polymer matrix;

a second polymer matrix comprising an inelastic polymer, constituting about 10–70% by weight of the macro-beads; and hollow micro-beads having a mean diameter of about 0.0003–0.125 inch, within the second polymer matrix, constituting about 30–90% by weight of the macro-beads, wherein the first polymer matrix comprises at least one of a polyurethane, a polysulfide or a thermoplastic polymer.

16. The insulation material of claim 15, comprising about 20–60% by weight of the first polymer matrix and about 40–80% by weight of the macrobeads.

17. The insulation material of claim 15, comprising about 30–50% by weight of the first polymer matrix and about 50–70% by weight of the macrobeads.

18. The combination of claim 15, wherein the layer of insulation material has a layer thickness of about 0.25–5.0 inches.

19. The combination of claim 15, wherein the layer of insulation material has a layer thickness of about 0.5–4.0 inches.

20. The combination of claim 15, wherein the layer of insulation material has a layer thickness of about 1.0–3.0 inches.

21. The combination of claim 15 further including an elastic cover material.

22. A combination including an object and a layer of thermal insulation material on the object, the insulation material comprising:

an elastic matrix polymer uniformly stretchable to at least 125% of an initial length;

a plurality of macro-beads having a mean diameter of 0.10–0.75 inch, within the elastic matrix polymer;

an inelastic matrix polymer uniformly stretchable to no more than 120% of an initial length, within the macro-beads; and a plurality of hollow micro-beads having a mean diameter of 0.0005–0.05 inch, within the inelastic matrix polymer, wherein the elastic matrix polymer comprises at least one of a polyurethane, a polysulfide or a thermoplastic polymer.

23. The insulation material of claim 22, wherein the micro-beads are at least 10% hollow.

24. The insulation material of claim 22, wherein the micro-beads are at least 25% hollow.

25. The insulation material of claim 22, wherein the micro-beads are at least 50% hollow.

26. The insulation material of claim 22, wherein the micro-beads are solid.

27. The insulation material of claim 22, wherein the micro-beads comprise a ceramic material.

28. The insulation material of claim 22, wherein the micro-beads comprise glass.

29. The insulation material of claim 22, wherein the micro-beads comprise plastic.

* * * * *